United States Patent [19]
Phillips

[11] Patent Number: 5,368,127
[45] Date of Patent: * Nov. 29, 1994

[54] COMPACT PORTABLE TREE STAND

[76] Inventor: W. C. Phillips, Rte. 1, Box 91A, Maud, Tex. 75501

[*] Notice: The portion of the term of this patent subsequent to Jan. 18, 2011 has been disclaimed.

[21] Appl. No.: 60,752

[22] Filed: May 12, 1993

Related U.S. Application Data

[63] Continuation-in-part of Ser. No. 936,673, Aug. 28, 1992, Pat. No. 5,279,390.

[51] Int. Cl.$^5$ .............................................. A01M 31/00
[52] U.S. Cl. ...................................... 182/187; 182/100; 182/116
[58] Field of Search .............. 182/116, 187, 136, 188, 182/100, 93, 133; 108/108

[56] References Cited

U.S. PATENT DOCUMENTS

| | | | |
|---|---|---|---|
| 3,282,375 | 11/1966 | Ray | 182/116 X |
| 3,485,320 | 12/1969 | Jones | 182/187 X |
| 3,630,314 | 12/1971 | Bamburg | 182/116 |
| 4,100,999 | 7/1978 | Conner | 182/187 X |
| 4,257,490 | 3/1981 | Bandy | 182/116 |
| 4,331,216 | 5/1982 | Amacker | 182/136 X |
| 4,552,246 | 11/1985 | Thomas | 182/116 |
| 4,552,247 | 11/1985 | Purdy | 182/187 X |
| 4,742,888 | 5/1988 | Amacker | 182/116 |
| 4,787,476 | 11/1988 | Lee | 182/116 |
| 5,105,908 | 4/1992 | Freud | 182/187 X |
| 5,167,298 | 12/1992 | Porter | 182/187 |

FOREIGN PATENT DOCUMENTS

375022 5/1923 Germany ........................ 182/116

*Primary Examiner*—Karen J. Chotkowski
*Attorney, Agent, or Firm*—Crutsinger & Booth

[57] ABSTRACT

A tree stand for use in observing and hunting game is provided. The stand forms an elevated platform and means for connecting the stand to a tree. In one aspect of the invention, the seat and footrest can be folded up for ease of transportation. In another aspect, the ladder assembly can be dissassembled for ease of transportation. In yet another aspect of the invention, the dissassembled ladder sections of the ladder assembly can be mated with a plurality of members on the platform and tied to the platform for secure transportation and storage.

6 Claims, 6 Drawing Sheets

COMPACT PORTABLE TREE STAND

CROSS-REFERENCE TO RELATED APPLICATION

This is a continuation-in-part of U.S. patent application Ser. No. 07/936,673 filed on Aug. 28, 1992 entitled "Improved Tree Stand" now U.S. Pat. No. 5,279,390.

BACKGROUND OF THE INVENTION

This application relates to stands for use in observing and hunting wildlife from an elevated position. More particularly, the stands involved in this application relate to tree stands or stands which are supported in part from or against a tree. More particularly, the present invention relates to a tree stand which can be easily transported, erected and used. The present invention also includes a tree stand with an improved structure for connecting the stand to the tree.

When hunting or observing game it is desirable for various reasons to be in a position elevated above the ground. The elevated position provides a better view of the surroundings and reduces the possibility of detection. In the past, various types of elevated tree stands have been in use. Prior to making the present invention I have made and marketed a single pole tree stand having a pole-type ladder leg to support a horizontal seat or platform against a tree. The platform had spikes on one side thereof and a pair of pivotally mounted spiked locking arms for gripping the sides of the tree. A cinching rope was used to force the locking arms into the sides of the tree and retain the platform in the elevated position.

SUMMARY OF THE INVENTION

My present invention relates to improvements in tree stands of the type which are supported in part from or against a tree, post, pole, or the like. My improved tree stand has a frame with a horizontally extending seat platform and at least one leg extending from the frame for partially supporting the platform in an elevated position against a tree, post, or the like. A V-shaped spiked bar extends from one side of the platform for engaging the tree. At least one locking arm is pivotally connected to the side of the platform for engaging the tree. A roping dowel extends from the opposite side of the platform. A fastening means such as a rope, cable or the like extends from the locking arm around the tree to the roping dowel to firmly connect the platform to the tree. In addition, the leg extending from the frame is constructed from a metallic tubing divided into a plurality of sections. The leg sections releasibly engage each other in a pin and socket relationship. In this manner the leg sections can be disassembled so that the portable tree stand can be easily transported to a remote site. A plurality of steps are formed on each of the leg sections whereby the leg can be used as a ladder for reaching the platform. The height of the platform can be selected by using the desired number of leg sections.

In another aspect of the invention, the frame for partially supporting the platform has a plurality of pins or sockets for releasibly engaging the leg sections to the frame adjacent to the seat platform so that the leg sections are secured to the frame during storage and transportation.

BRIEF DESCRIPTION OF THE DRAWINGS

The advantages and features of the improved stand of the present invention will be more readily appreciated by those of ordinary skill in the art as disclosure thereof is made in the following detailed description by reference to the accompanying drawings in which.

DESCRIPTION OF PREFERRED EMBODIMENTS

Figure 1:
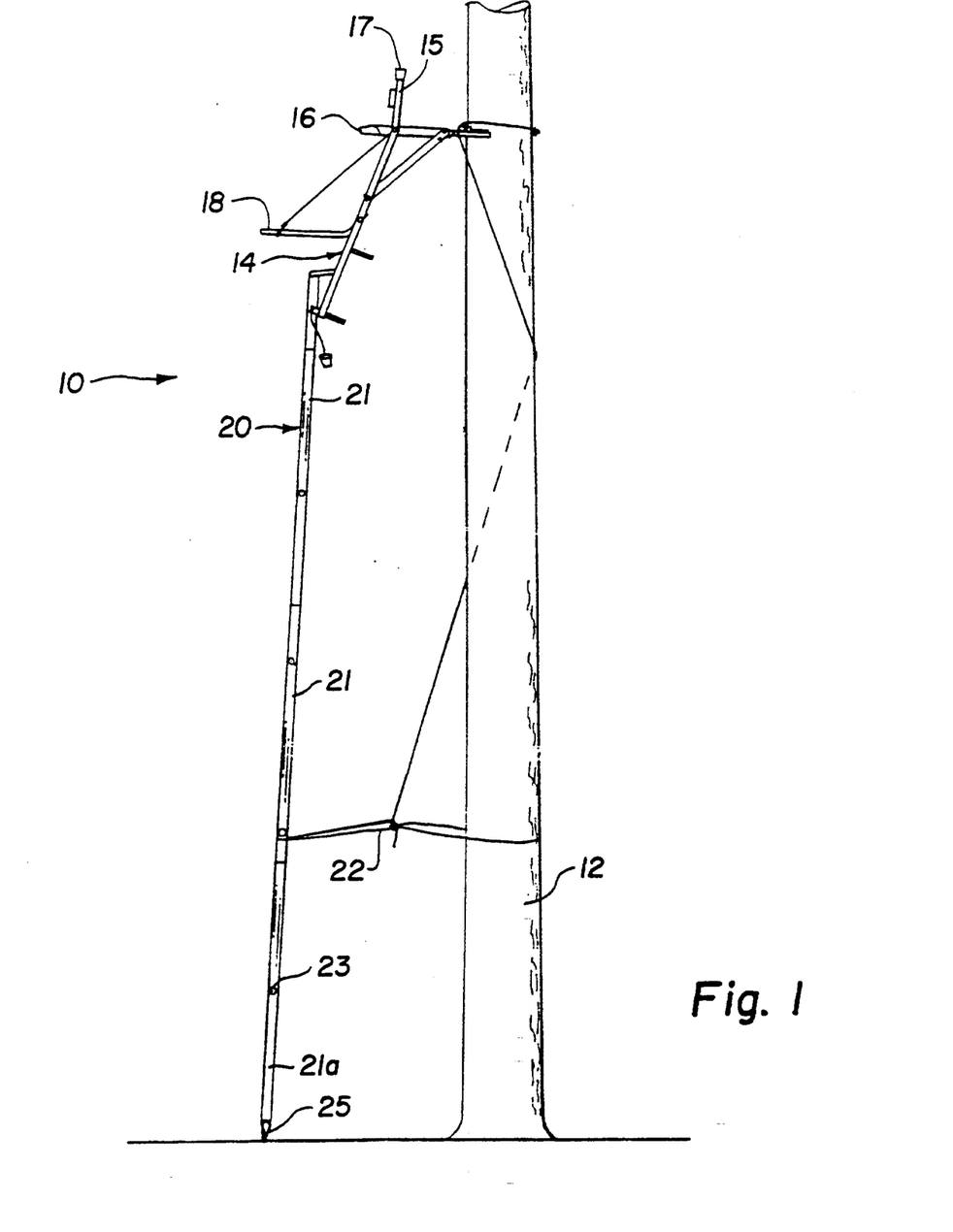
FIG. 1 is a side elevation view showing the improved tree stand assembled and connected to a tree.

Referring now to the drawing wherein like characters designate like or corresponding parts throughout the several views, there is illustrated in FIG. 1 one embodiment of the improved tree stand of the present invention shown assembled and attached to a tree, pole, or the like. In FIG. 1 the stand is identified generally by reference numeral 10 and is shown mounted against the trunk of tree 12. Stand 10 has a frame 14 and a generally horizontally extending seat 16. It is noted that a portion 15 of frame 14 extends above each side of seat 16 as shown. The upper ends of portion 15 act as an arm rest and are covered by a rubber cup 17. Portion 15 forms hand holds to assist a person in mounting the platform after is it attached to tree 12. As will be described, the seat 16 is pivotally connected to frame 14 and will fold into the plane of frame 14 for easy transport.

Footrest 18 is provided and positioned below the seat 16. Footrest 18 extends horizontally from frame 14 in a direction away from the tree 12. The footrest 18 has a non-slip upper surface for safety and, like the seat 16, folds into the plane of frame 14 for transport.

Stand 10 has a ladder leg assembly 20. In the present embodiment, ladder leg assembly 20 comprises two upper leg sections 21 and a lower leg section 21a.

Figure 4:
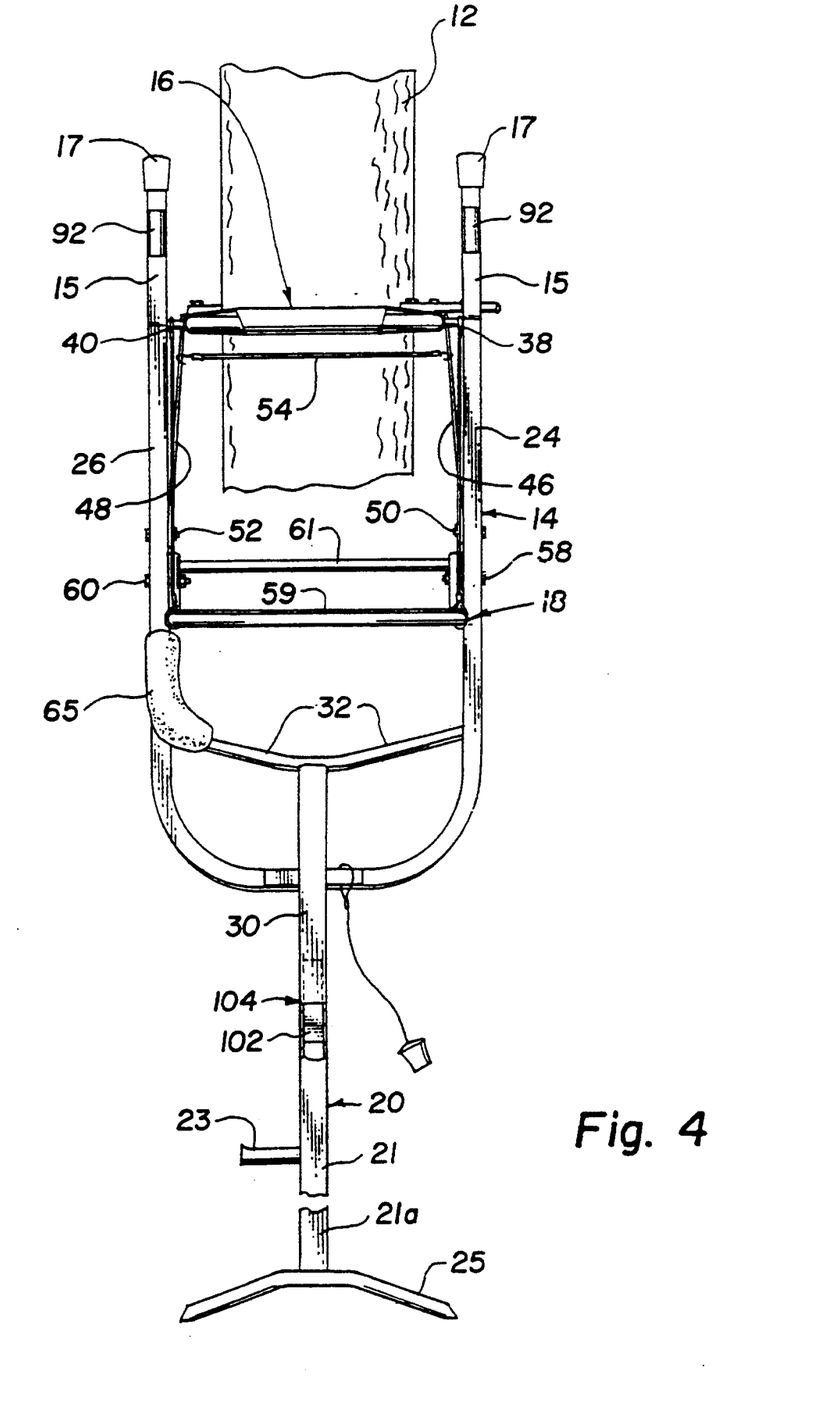
FIG. 4 is an enlarged partial front elevation view of a portion of the tree stand shown in FIG. 1.

As is shown in FIG. 4, the lower leg section 21a is different from the upper two sections 21 in that it has a stabilizing base 25 welded thereto. As will hereinafter be described in detail, the leg sections 21 and 21a are connected by mating sockets and pins formed at the ends of the leg sections.

As will be described in detail, the leg sections 21 and 21a are preferably formed from rectangular cross-section shaped material and have rectangular cross-section pin and socket elements on the ends thereof for assembly into a single ladder leg 20. The ladder leg assembly 20 acts both as a support and a ladder for gaining access to the seat 16 of the tree stand 10, as the sections each have a plurality of steps 23 formed thereon.

The tree stand 10 is formed in a plurality of sections which fold up for ease in carrying. In use the stand is transported to the site, assembled and lifted into position with the leg ladder assembly 20 at a slight angle from the tree 12. As will be described in detail, a fastening means such as a rope 22 is used in conjunction with a "V" locking means (not shown in FIG. 1) to attach the tree stand 10 to the tree 12. The assembly 20, which doubles as a ladder, is climbed to gain access to the stand where the user sits on the seat 16, facing away from the tree using the footrest 18 for foot support.

In the embodiment shown in FIG. 1, the ladder leg assembly 20 is formed in three sections which allows the tree stand 10 to be selectively installed with the seat 16 at heights, for example, of about 7 feet, 11 feet or 14 feet. In accordance with my invention, additional or fewer sections could be used, and the sections could be longer or shorter, however, the number and length of the ladder sections should be convenient for carrying. Preferably, the frame 14 and leg sections 21 and 21a of the tree stand 10 are constructed from a light weight but strong material such as aluminum alloys used in the aircraft industry.

For purposes of understanding the size and perspective of the stand shown in FIG. 1, seat 16 is shown as a padded seat with foam cushioning and a waterproof vinyl covering. The seat itself is about 18" by 18". It is to be appreciated that the seat 16 could be made of any size and shape to fit the desired application.

Figure 2:
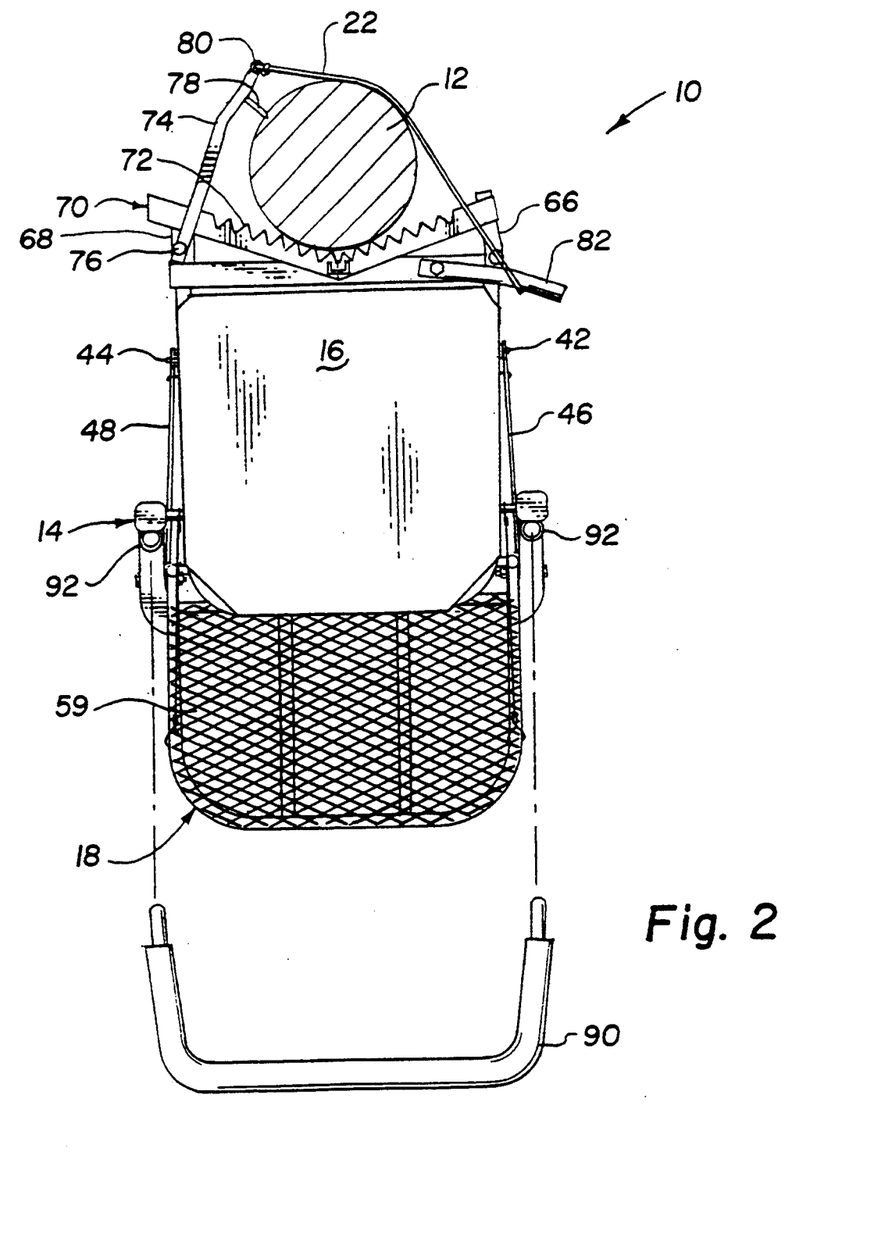
FIG. 2 is a section view taken on line 2—2 of FIG. 1 looking in the direction of the arrows.
Figure 3:
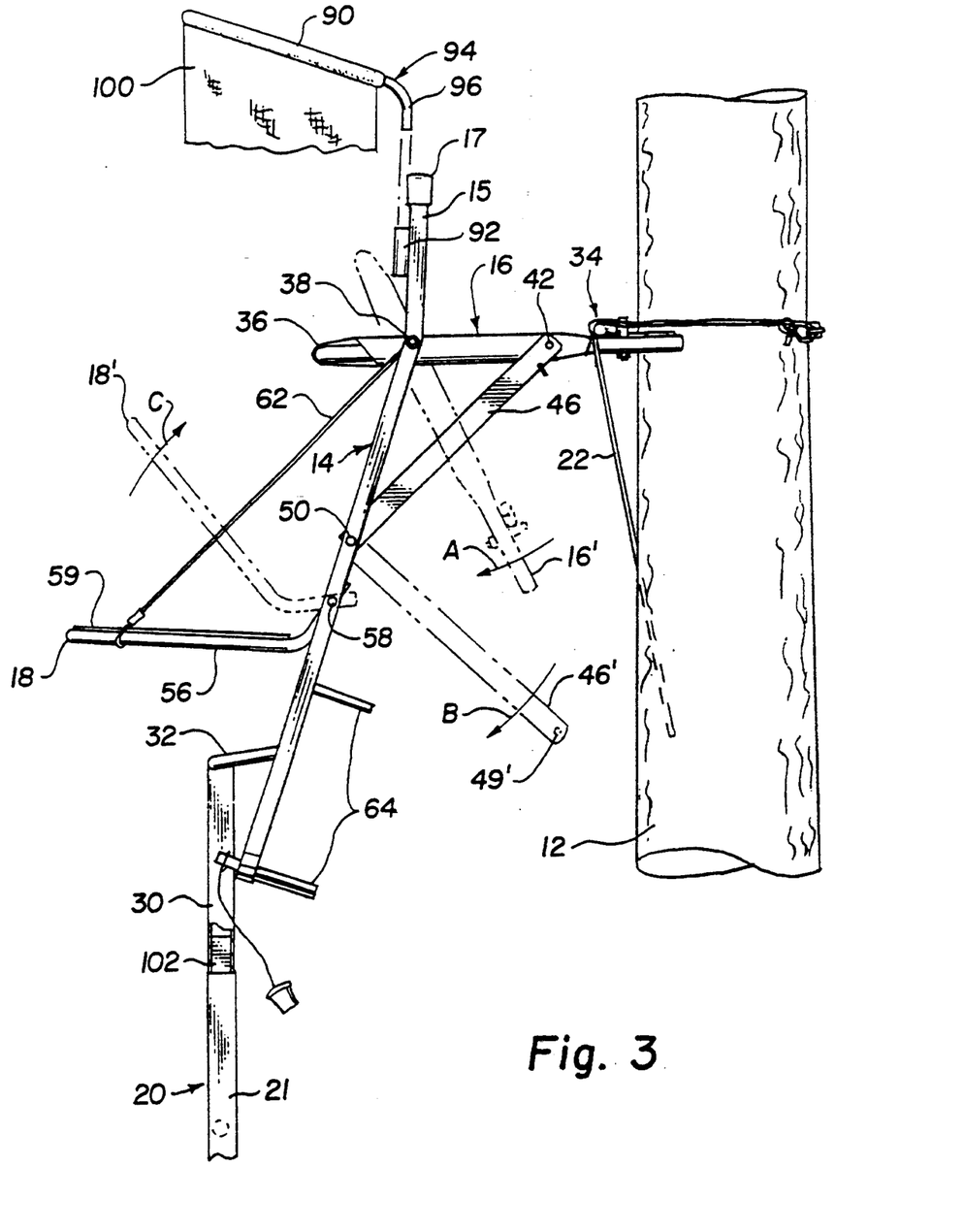
FIG. 3 is an enlarged partial side elevation view of a portion of the tree stand shown in FIG. 1.

By reference to FIGS. 2, 3 and 4 the structural details of the stand 10 of the present invention will be described. As best shown in FIG. 3 and 4, frame 14 consists of a U-shaped portion having upwardly extending legs 24 and 26. The ends of these legs 24 and 26 form portions 15. In the present embodiment portions 15 have a rubber cup 17 protecting the end thereof. The frame 14 has a downwardly extending portion 30 for removable connection to ladder leg assembly 20. Portion 30 is fixed to the bottom of the U-shaped portion and has a pair of braces 32 in its upwardly extending end. In the preferred embodiment of frame 14, portion 30 and braces 32 are welded together to form a rigid structure.

When in use, one end 34 of seat 16 rests against the tree 12 and the other end 36 extends between the legs 24 and 26 of the frame 14. Seat 16 is pivotally connected at 38 to leg 24 and at 40 to leg 26. Pivots 38 and 40 are located in axial alignment along a horizontally extending axis. As is shown in FIG. 3, seat 16 can rotate about pivots 38 and 40 in the direction of arrow "A" to a position completely within the frame 14 for ease in transport. The seat is shown in phantom lines in FIG. 3 in a partially rotated position and is identified by reference numeral 16'. As shown in FIGS. 2 and 3, a pair of pins 42 and 44 extend from opposite sides of the seat 16. A pair of seat braces 46 and 48 are pivotally connected to frame 14 at 50 and 52, respectively. As shown in FIG. 3, this pivotal connection allows the braces 46 and 48 to rotate in the direction of arrow "B." This allows the brace to be rotated within the frame 14 for purposes of transport. In addition, as best shown on brace 46' in FIG. 3, each of the braces 46 and 48 have an aperture 49' therethrough of a size to receive the pins 42 and 44. As best shown in FIG. 4, a resilient means 54 such as a bungi cord is connected between the braces and acts as a lock to resiliently urge the braces 46 and 48 toward each other. In this manner the braces are retained on the pins 42 and 44, and the seat is locked in a generally horizontal position for use. To stow the seat 16, the resilient means 54 is released, the seat braces 46 and 48 are removed from the pins 42 and 44 and the seat and braces are rotated into a position coextensive with the frame 14.

Referring now to FIGS. 3 and 4, footrest 18 has a frame 56 pivotally connected at 58 to leg 24 and at 60 to leg 26. Footrest 18 pivots about 58 and 60 in the direction of arrow "C," as shown in FIG. 3. The footrest is shown in phantom lines in FIG. 3 in a partially pivoted position and is identified by reference numeral 18'. In this manner, the footrest can be rotated to a stowed position adjacent to the frame 14. A pair of cables 62 limit downward rotation and provide support for the footrest. The upper surface 59 of the footrest is formed by welding non-slip expanded mesh to the frame 56. A heel rest 61 is welded between the sides of the frame 56 (see FIG. 4). A plurality of short pins 64 extend from the frame 14 as shown in FIG. 3. Pins 64 are useful in connecting the leg sections of assemly 20 to the frame for transport. A pad 65 is formed on frame 14 as shown in FIG. 4 for use in transporting the frame.

According to a particular feature of the present invention tree stand 10 utilizes a V-lock system for attachment to a tree. This V-lock system extends from the frame of the seat 16 at end 34. As can be seen in FIG. 2, the seat frame has extending portions 66 and 68 which support a V-shaped tree receiving member 70. Member 70 forms a V-shaped opening whose internal angle is between 90 and 180 degrees and is preferably approximately 130 degrees for engaging the side of the tree. A plurality of spikes or teeth 72 are formed along the length of the member 70. Teeth 72 assist in preventing torque or rotation about the tree. A locking bar 74 is pivotally connected at 76 to the frame of the seat 16. The outer end of the bar 74 has at least one spike 78 thereon. An eyelet 80 is formed on the end of the bar 74 for receiving a rope, cable or the like. A roping dowel 82 extends from the frame of the seat on the side opposite the pivot 76. A fastening means such as rope 22 has one end connected to the eyelet 80. When in use the rope 22 passes around the back of the tree 12 and over roping dowel 82 as shown in FIG. 1 to force the pivotally mounted, spiked locking bar 74 into the side of the tree to connect the platform 16 to the tree as shown. The teeth 72 on V-shaped member 70 and the spike 78 of locking bar 74 when engaged by the rope 22 provide opposed locking forces on the tree.

In FIG. 3 a combined gun rest-blind, which is generally referred to by the numeral 90, is shown separated from the frame 14. Frame 14 has a pair of tubular sockets 92 welded to the portions 15. Sockets 92 are used for removably attaching the gun rest-blind 90 to the frame 14. The gun rest-blind 90 consists of a tubular frame 94 bent into a generally U-shaped configuration. The frame 94 has a pair of downwardly extending ends 96 which form pins that slip into the interior of the sockets 92 for releasibly attaching the blind 90 to the frame 14. Optionally, the frame 96 can have soft foam padding around the frame 94 for comfort, and furthermore, a camouflage skirt or blind material 100 hanging in a downward direction as shown in FIG. 3 camouflaging a portion of the tree stand 10 from view.

FIG. 4 shows a typical pin and socket connection utilized to connect the leg sections 21 and 21a together and to connect the leg sections 21 or 21a with portion 30 of frame 14. The upper end of each leg section 21 and 21a has a pin end 102. The pin end 102 has an exterior shape which is rectangular and fits in and closely approximates the interior 104 of the lower end of the next adjacent leg section 21 or portion 30 of frame 14. Interior 104 of the adjacent leg sections 21, 21a and portion 30 each form a socket into which the pin end 102 of a leg section 21 or 21a releasibly fits to connect the leg sections together and to the frame 14.

To set up the stand 10, the footrest 18 is pivotally moved to a lowered position so the seat 16 will clear, then the seat 16 is raised to the correct horizontal position so that the braces 46 and 48 can be hooked onto the pins 42 and 44. The resilient means 54 is connected between the braces 46 and 48 to hold the braces on the pins 42 and 44. Next, the leg sections 21 and 21a are connected at their mating pin and sockets and the pin 102 of uppermost leg 21 is inserted into socket 104 of portion 30 on frame 14. The assembled tree stand 10 is then ready to set up against a supporting tree, pole, or the like. As previously described, it is not necessary to use every leg section 21, thus the length of the leg ladder assembly 20 is selectively adjustable.

The assembled tree stand 10 is then "walked" up to and leaned against the tree 12 at a slight angle as shown in FIG. 1. The base 25 of leg section 21a is firmly pressed into the ground. The rope 22 is "whipped" around the tree 12 to cause the rope 22 to loop over the roping dowel 82 as shown in FIG. 2. The rope 22 is pulled tight to cause spike 78 to bite into the tree and walked around the tree reversing the direction of pull to wrap the rope around the roping dowel 82. The rope 22 is then pulled tight to force the spike into tree. While holding the rope tight, the rope is walked around the ladder leg assembly 20 and positioned at about shoulder height, and then walked one or two more revolutions around the tree. Finally, the rope 22 is tied to the ladder leg assembly 20 and the criss-crossing rope lengths are bound together as shown to create sufficient pressure on the ladder leg assembly 20 to hold the locking system securely. The rope must be tied securely under pressure, but excessive pressure is not necessary to securely bind the tree stand 10 to the tree.

Figure 5:
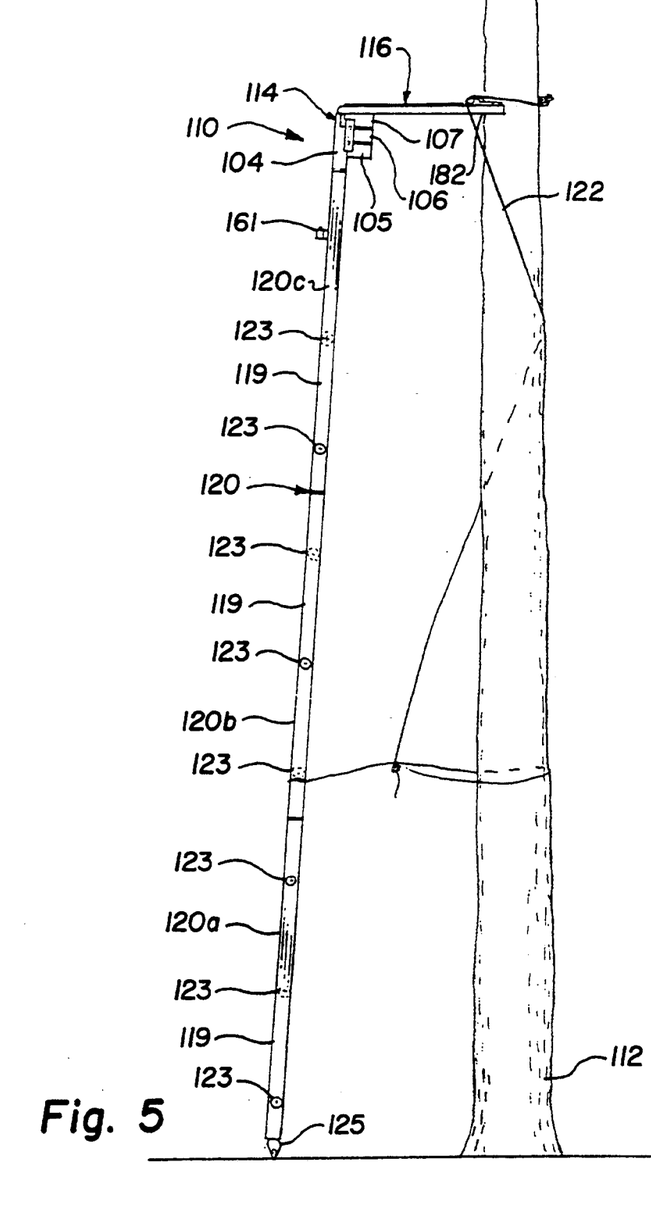
FIG. 5 is a side elevation view showing an alternative embodiment of the tree stand assembled and connected to a tree, the frame having a plurality of sockets for securing the legs to the frame during storage and transportation.

Referring now to FIGS. 5–8 of the drawing, another, more compact embodiment of the invention will be described. In FIG. 5, a tree stand, generally referred to by the reference numeral 110, is shown mounted against the trunk of tree 112. Tree stand 110 has a frame 114 partially supporting a platform 116. When mounted against a tree 112, platform 116 is horizontally extending and forms a seat for a person. Preferably, platform 116 is rigidly connected to frame 114, for example, by welding.

Tree stand 110 includes a ladder assembly 120. In the present embodiment, ladder assembly 120 comprises lower ladder section 120a and upper ladder sections 120b and 120c. Each ladder section includes at least one pole portion 119 for vertically supporting frame 114 and platform 116. Each ladder section also includes a plurality of spaced-apart, horizontally extending steps 123 connected to the pole portion 119 so that a person can climb the ladder assembly to the platform 116. Lowermost ladder section 120a also has a base 125 that can be pressed into the ground so that the ladder assembly 120 does not slide away from the tree. Preferably a heel rest 118 is provided below the platform 118. Heel rest 118 extends horizontally from ladder section 120c.

Similar to the previous description with respect to FIG. 4, the ladder sections 120a, 120b and 120c can be releasibly connected by mating pins 102 and sockets 104 formed at the ends of the pole portions 119 and a socket 104 formed on frame 114. Preferably, the ladder sections are preferably formed from rectangular cross-section shaped material and have rectangular cross-section socket and pin elements on the ends thereof for assembling the ladder sections into the ladder assembly 120. The rectangular cross-section prevents the pins 102 from rotating in the sockets 104 so that the steps 123 of the ladder assembly 120 can be retained in parallel alignment. Preferably, the frame 114 and ladder sections 120a–c are formed from a light weight but strong material such as aluminum alloys used in the aircraft industry.

Figure 6:
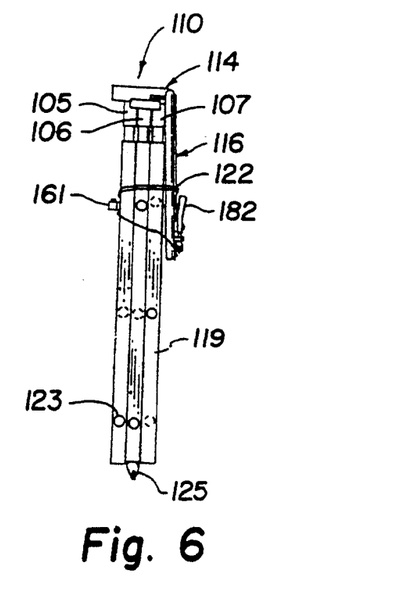
FIG. 6 is a side elevation view of the disassembled tree stand showing the leg sections connected to the frame for storage and transportation.

As will hereinafter be described in more detail, the frame 114 and the ladder sections 120a, 120b, and 120c shown in FIG. 5 can be separated and reassembled in the configuration shown in FIG. 6 for ease in carrying the tree stand 110. In use, the stand is transported to the site, assembled and lifted into position with the ladder assembly 120 at a slight angle from the tree 112. As will be described in detail, a fastening means such as a rope 122 is used in conjunction with a "V" locking means (not shown in FIG. 5) to attach the tree stand 110 to the tree 112. The ladder assembly 120 is climbed to gain access to the stand where the user sits on the platform 116, facing away from the tree.

In the embodiment shown in FIG. 5, the ladder assembly 120 is formed in three sections, which allows the tree stand 110 to be selectively installed with one or more of the ladder sections so that the platform 116 is supported against the tree 112 at three different heights, for example, of about 7 feet, 11 feet or 14 feet. In accordance with my invention, additional or fewer ladder sections could be used, and the sections could be longer or shorter, however, the number and length of the ladder sections should be convenient for carrying.

Figure 7:
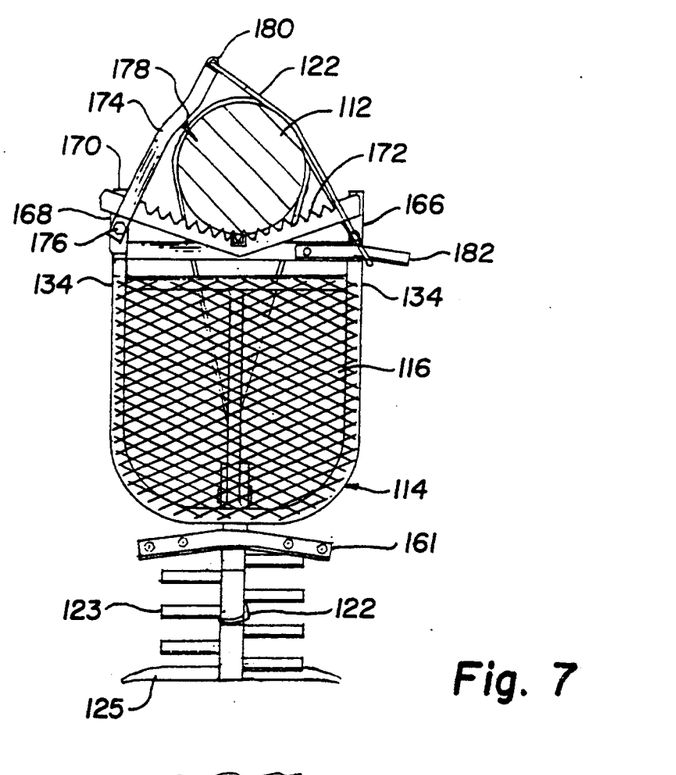
FIG. 7 is a top plan view of the tree stand assembled and connected to a tree as shown in FIG. 5.
Figure 8:
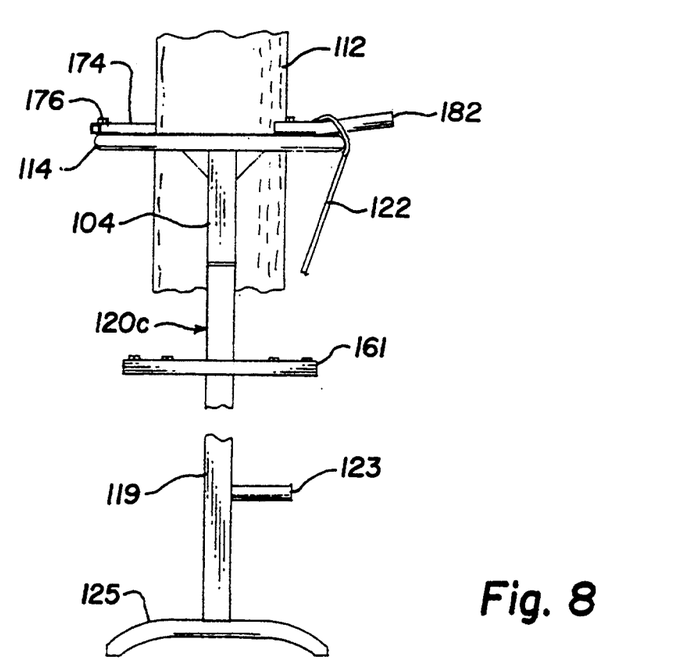
FIG. 8 is a front elevation view of the tree stand assembled and connected to a tree as shown in FIG. 5.

By reference to FIGS. 7 and 8 the structural details of the tree stand 110 will be described. As best shown in FIG. 7, frame 114 comprises a U-shaped portion that supports the platform 116, which can be formed, for example, of a lightweight metal mesh. If desired, the platform could also be provided with a padded covering as previously described. When in use, one end 134 of frame 114 rests against the tree 112, and the ladder assembly is connected to the other end of the frame 114.

Tree stand 110 utilizes the above-described V-lock system for attachment to a tree. This V-lock system extends from the frame 114 of the platform 116 at end 134. As can be seen in FIG. 7, the frame has extending portions 166 and 168 which support a V-shaped tree receiving member 170. Member 170 forms a V-shaped opening whose internal angle is between 90 and 180 degrees and is preferably approximately 130 degrees for engaging the side of the tree. A plurality of spikes or teeth 172 are formed along the length of the member 170. Teeth 172 assist in preventing torque or rotation about the tree. A locking arm 174 is pivotally connected at 176 to the extending portion 168 of the frame 114. The outer end of the bar 174 has at least one spike 178 thereon. An eyelet 180 is formed on the end of the locking arm 174 for receiving a rope, cable or the like. A roping dowel 182 extends from the extending portion 166 of the frame on the side opposite the pivot 176. A fastening means such as rope 122 has one end connected to the eyelet 180. When in use the rope 122 passes around the back of the tree 112 and over roping dowel 182 as shown in FIG. 5 to force the pivotally mounted, spiked locking arm 174 into the side of the tree to connect the tree stand 110 to the tree as shown. The teeth 172 on V-shaped member 170 and the spike 178 of locking arm 174 when engaged by the rope 122 provide opposed locking forces on the tree.

Because of the simple structure of the frame 114 and platform 116, the tree stand is easy to assemble. To set up the tree stand 110, the desired number of ladder sections are connected end to end and the upper ladder section is connected to socket 104 on the frame 114. The assembled tree stand is then ready to set up against a supporting tree, pole, or the like. The tree assembled stand is "walked" up to and leaned against the tree 112 at a slight angled as shown in FIG. 5, and the tree stand 110 is secured to the tree as previously described with respect to FIG. 1.

To transport and store the tree stand 110, the rope 122 is untied, unwound from about the tree stand and tree, and then whipped off the roping dowel 182. The rope 22 is pulled so that the spiked arm 174 is pulled away from the tree. The tree stand is then "walked" down from the tree and the ladder sections disassembled. As best shown in FIG. 6, the ladder sections are then inserted into socket 105, 106, and 107 formed on the frame 114, and at least a portion of the rope 122 is wound around the ladder sections to hold them in place. Thus, the disassembled tree stand is conveniently packed in a compact manner for transportation.

The foregoing description relates to only the most preferred embodiments of the present invention. It should be understood that the present invention contemplates that numerous alterations and changes can be made to the form of the invention without departing from the scope of the following claims.

Having described the invention, I claim:

1. A hunting stand for attachment to a tree, post, or the like to support a hunter or wildlife observer in an elevated position, the stand comprising:

a horizontally extending platform for supporting a person;

a plurality of ladder sections having end mating members whereby said ladder sections can be releasably connected to each other in end to end relationship;

at least one support mating member connected to said platform whereby at least one said end mating members of said ladder sections can be releasably connected to said platform for partially supporting said platform in an elevated position against a tree, post or the like;

a plurality of storage mating members connected to said platform for releasably connecting said end mating members of said ladder sections to said storage mating members whereby said ladder sections are retained adjacent said platform for compact transportation and storage;

a V-shaped spiked bar connected to said platform, said V-shaped spike bar having a plurality of teeth for engaging said platform to the tree;

at least one locking arm, said locking arm having at least one spike thereon, one end of said locking arm pivotally coupled to said platform for pivoting said locking arm into releasable engagement with the tree, post or the like;

a roping dowel mounted on said platform on the side opposed said one side; and a fastening means connected to said locking arm such that when said fastening means is drawn over said roping dowel, said locking arm is pulled toward said roping dowel into engagement with the tree, post, or the like and said spike on said locking arm is opposed to at least one of said teeth on said V-shaped spike bar to provide opposed locking forces on the tree, post, or the like.

2. The hunting stand of claim 1 additionally comprising a pair of horizontally extending sockets mounted on either side of the other end of said platform and a gun rest removably supported from said sockets.

3. The hunting stand of claim 1 wherein said ladder sections have at least one pole portion formed from tubing with a rectangular cross-section.

4. The hunting stand of claim 3 wherein said end mating members of said ladder sections formed and said platform comprise pin and socket couplings, and said support and storage mating members connected to said platform comprise pin and socket couplings.

5. The hunting stand of claim 3 wherein said pole portion has a plurality of steps extending from either side thereof.

6. The hunting stand of claim 1 wherein said fastening means comprises a flexible element such as a rope or cable.

* * * * *